United States Patent [19]

Bachmann et al.

[11] Patent Number: 4,919,169

[45] Date of Patent: Apr. 24, 1990

[54] GAS FLOW DIVERTER

[76] Inventors: Lothar Bachmann, Box 519; William F. Koch, R.R. 3, Box 483, both of, Auburn, Me. 04210

[21] Appl. No.: 338,917

[22] Filed: Apr. 14, 1989

Related U.S. Application Data

[63] Continuation-in-part of Ser. No. 55,594, May 29, 1987, Pat. No. 4,821,507.

[51] Int. Cl.⁵ .............................................. F16K 1/00
[52] U.S. Cl. .................................. 137/875; 60/39.182
[58] Field of Search ........................ 60/39.182, 39.181; 137/875, 872, 870, 862, 527.6; 126/285 R; 110/163

[56] References Cited

U.S. PATENT DOCUMENTS

| | | | |
|---|---|---|---|
| 1,180,817 | 4/1916 | Ballard | 137/875 |
| 2,605,076 | 7/1952 | Tanke | 137/875 |
| 3,805,884 | 4/1974 | Burt et al. | 137/875 |
| 3,897,773 | 8/1975 | Burt et al. | 137/875 |
| 4,027,654 | 6/1977 | Kannapell | 110/163 |
| 4,582,296 | 4/1986 | Bachmann | 251/250 |

Primary Examiner—Donald E. Stout

[57] ABSTRACT

A gas flow diverter receives large volumes of hot gases from a gas turbine into a chamber in which is a pivotally mounted blade adapted to close either the outlet port to a heat recovery steam generator or the outlet port to the stack. Each port is surrounded by an open channel, the two side walls of each of which are provided with an exposed seal arranged one beyond the other. One or both surfaces of the blade is insulated, the insulated surface(s) being covered with steel cladding and the uncovered surface being a stainless steel membrane adapted to resist corrosion from the hot gases. The steel cladding is connected through insulation to the underlying structure in a manner permitting but confining the expansion of the cladding. The blade's border is provided with first and second marginal ledges adapted, respectively, when the blade is in a closed position to engage a different one of the two exposed seals bordering an outlet port, thus establishing the channel as a closed passageway surrounding the closed port which may be further sealed against leakage by discharging sealing air into it. The blade is shifted between its two operative positions by means of a reversible drive including toggle joints connected to the blade by a unit which is shiftable in response to forces exerted by the expanding or contracting toggle joints. During blade movement the sealing air is cut off and its passageway into the chamber closed against the escape of hot gases.

12 Claims, 10 Drawing Sheets

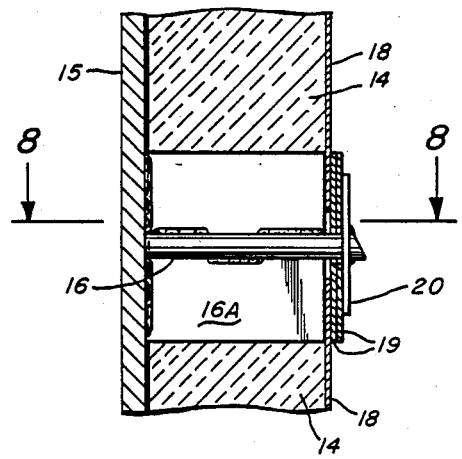
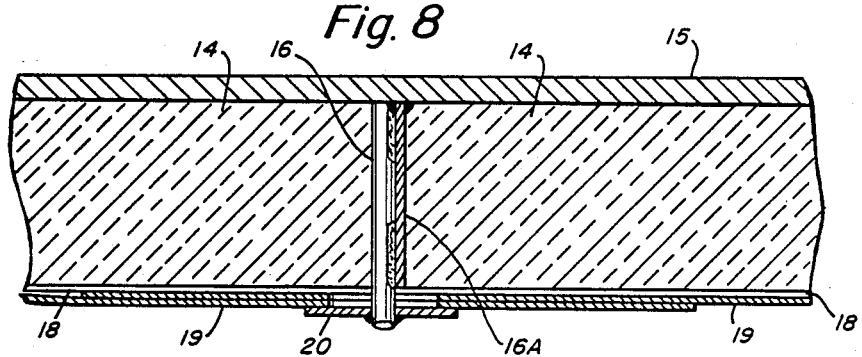
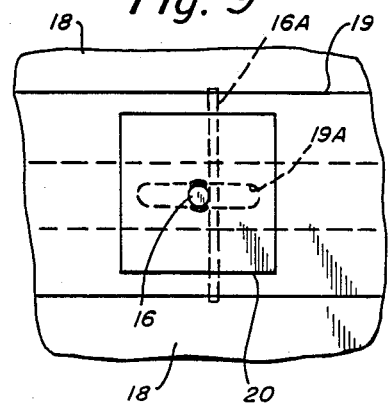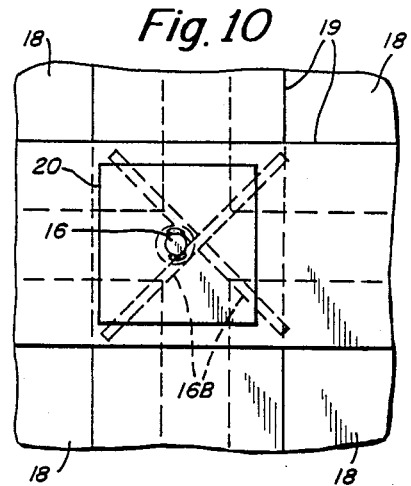

GAS FLOW DIVERTER

This application is a continuation-in-part of application Ser. No. 55,594, filed May 29, 1987, now U.S. Pat. No. 4,821,507.

This invention relates to fluid diverters, especially hot gas diverters, used selectively to divert fluid flow from an inlet port to one of two outlet ports of a chamber.

BACKGROUND OF THE INVENTION

Gas flow diverters are employed to deliver hot exhaust gases from a turbine either to a heat recovering steam generator or to the stack. Many problems are attendant their use due to the large volumes of gases at high temperatures and under substantial pressure that are exhausted by turbines and the necessity that the hinged gas diverter blade be swung into and out of its operative positions relative to the stack and to the steam generator without vibrating and without causing thermal shock on the system. Such diverters are large as are the conduits leading therefrom to the steam generator or to the stack and as the conduit to the steam generator must be capable of being safely entered by service personnel, leakage into it must be prevented when gas flows are diverted to the stack in order to avoid the necessity of placing the turbine out of service.

So far as we are aware, gas flow diverters have not been fully satisfactory with respect to blade functions and have not been capable of ensuring zero gas leakage under all conditions.

Accordingly, it is the general objective of the present invention to provide hot gas flow diverters capable of functioning properly under all conditions.

A further object of the invention is to ensure that, with a diverter for delivering large volumes of hot gas under considerable pressure from a gas turbine or the like through outlet ports either to a heat recovering steam generator or to the stack, no leakage through a closed port will occur.

SUMMARY OF THE INVENTION

In accordance with the invention there is provided in a gas flow diverter for diverting hot gases from an inlet port to either of first and second mutually spaced outlet ports of a chamber by a blade pivotally mounted to swing between two positions within the chamber in each of which one outlet port is closed b the blade and the other is opened, the blade being connected to a pivot shaft rotatably mounted within the chamber and being linked by toggle joints to an actuator shaft spaced from and parallel to the pivot shaft, the following improvements.

A frame surrounds the blade, both sides of the frame comprising first ledges, and a central projection, both sides of which comprise second ledges; a U-shaped sealing frame surrounds each outlet port, and comprises first and second side walls, with the first side wall longer than the second side wall, each of the sealing frames being secured to the chamber and having an open end that opens into the chamber; leaf spring sealing members are mounted on said side walls; wherein the sealing members of said first and second side walls enter into sealing engagement with the first and second ledges, respectively, on the appropriate side of the blade frame when the blade is in one of its two closed positions, the actuator shaft being operable to adjust the position of the blade between such positions.

In preferred embodiments, the diverter further comprises:- means for delivering sealing air into a closed space formed within either of the sealing frames when such sealing frame is engaged by the blade; means to isolate the interior of the chamber from the means for delivering sealing air during movement the blade between its two positions; a layer of insulation secured to and lining each interior surface of said chamber and wherein the blade further comprises at least one reinforcement to which the frame of said blade is connected, with a layer of insulation covering at least that side of the blade remote from the connections to the pivot shaft, and cladding overlying the said layer of insulation; means for retaining the said layer of insulation in place, said retaining means being constructed and arranged to permit thermal expansion of the cladding; a layer of insulation on the other side of the blade positioned on each side of each reinforcement; a series of pins comprising the said retaining means, the pins anchoring the insulation to the underlying blade structure and extending through the cladding and insulation through oversized openings to permit the desired thermal expansion; an air space underlying each layer of insulation provided by the reinforcements; marginal frames closing the corresponding margins of each reinforcement; pivotal connecting means connecting each of the toggle joints to a respective reinforcement; the reinforcements are at least two in number and are spaced from each other and from the blade ends; and each of the pivotal connecting means comprises a base plate connected to a corresponding reinforcement, a second plate pivotally connected to the said base plate, a toggle joint link pivotally connected to the second plate, and resilient means connected between the plates, thereby to enable the second plate to move relative to the base plate in response to thermal expansion forces exerted thereon by the toggle joint connected thereto.

In a presently preferred embodiment the blade further comprises a stainless steel membrane and at least one strengthening member for the membrane, the layer of insulation covering only that side of the blade remote from the connections to its pivot shaft; the marginal frame is formed of two parts comprising a secondary channel frame member, both sides of which comprise the first sealing ledges, and a central member connected to the secondary frame having surfaces defining the second ledges, said members being connected to each other by retaining means permitting thermal expansion of the blade relative thereto.

Other objectives and advantages of the present invention will be apparent from the following description of a presently preferred embodiment taken in conjunction with the accompanying drawings and the appended claims.

BRIEF DESCRIPTION OF THE DRAWINGS

FIG. 7 is a fragmentary section illustrating the connection of insulation panels to the interior surface of the diverter chamber;

FIG. 8 is a section taken approximately along line 8—8 of FIG. 7;

FIG. 9 is a fragmentary plan view of the cladding which covers the insulation as shown in FIG. 7 showing the anchoring of adjacent corners of sections thereof;

FIG. 10 is a like view illustrating the anchoring of the sides of adjacent cladding sections;

DETAILED DESCRIPTION OF ONE PREFERRED EMBODIMENT

Figure 1:
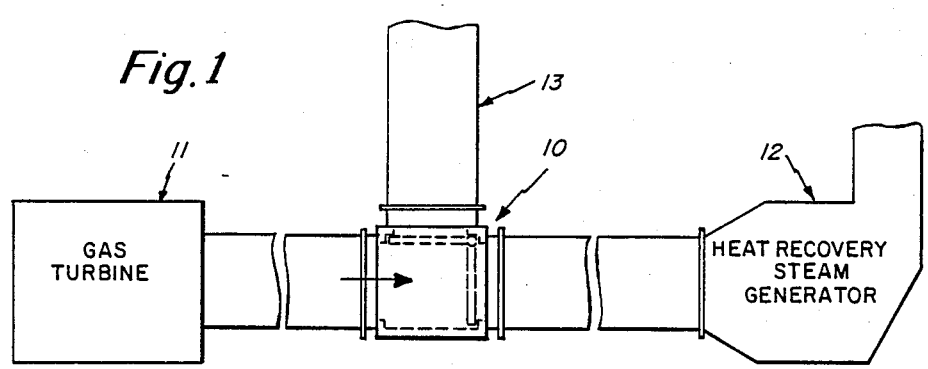
FIG. 1 is a somewhat schematic illustration of a typical installation of a diverter embodying the invention as installed between the exhaust of a gas turbine and the inlet of a stack and the inlet of a heat exchanger.
Figure 2:
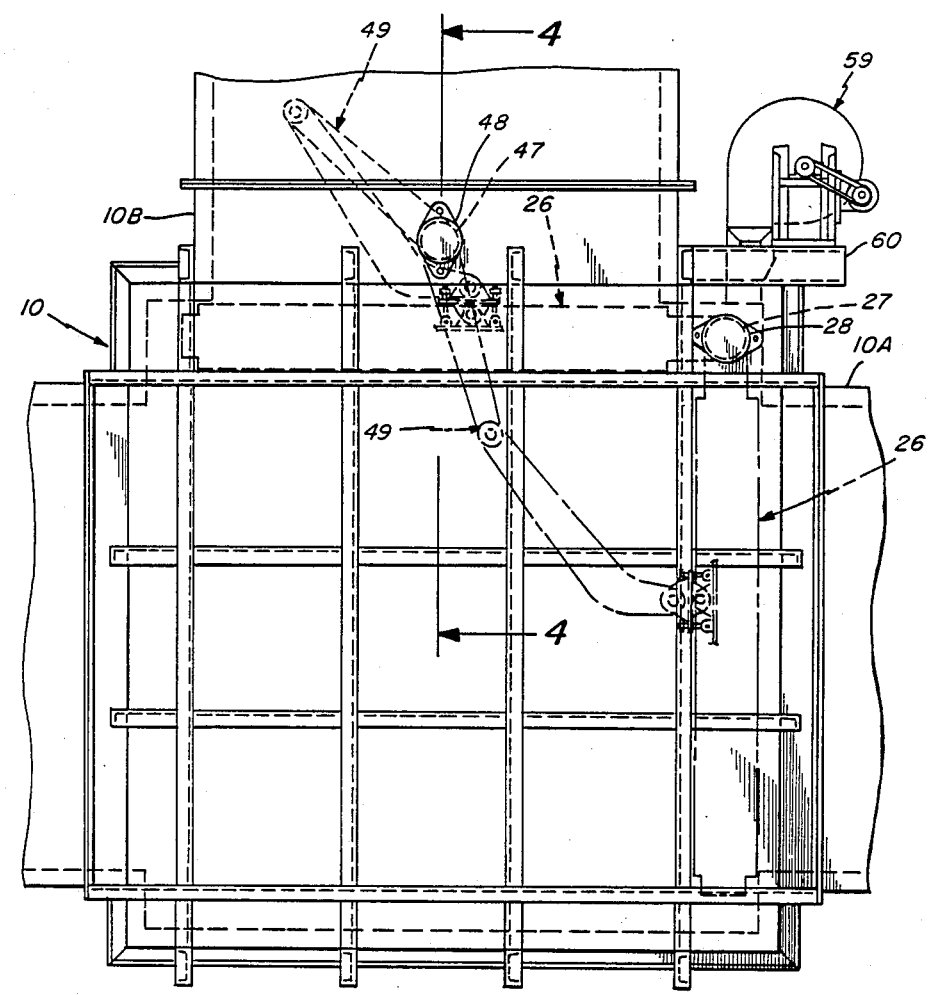
FIG. 2 is a side view of the diverter on a much larger scale.

A presently preferred embodiment of a gas flow diverter in accordance with the invention is generally indicated at 10 and is shown in FIG. 1 as connected to the exhaust of a gas turbine 11 and operable to deliver the large volume of hot exhaust gas therefrom either to a heat recovery generator 12 or to the stack.

The gas flow diverter 10 as shown is generally cubical and may be externally reinforced as may be required by a particular installation if the weight of the stack 13 is to be borne thereby. The interior surfaces of the diverter and its three ports are lined with insulation in the form of abutting panels 14 of a material adapted to withstand temperature of 1200° F. or higher. The panels 14 (FIGS. 7-9) are anchored to the walls 15 of the diverter by means of pins 16 welded to the interior surface thereof. Each panel 14 is covered by a stainless steel liner 18 with the liners so dimensioned that there are gaps between them which permit their expansion. The pins 16 extend through stainless steel grips which overlap the gaps between the liners and strips 19 are held in positions securing the panels 14 by retainers 20. Between adjacent sides of the liners (FIG. 9) the pins 16 extend through slots 19A in the strips 19 and have wings 16A overlying the liner margins. At the corners of the panels, the pins extend through oversized holes in the strips 19 and have wings 16B in the form of a cross to overlie all four liners. If the panel size warrants the use of central anchoring means pins 16 are employed for that purpose and extend through such panels and their liner 18 and are provided with overlapping retainers 20.

Figure 6:
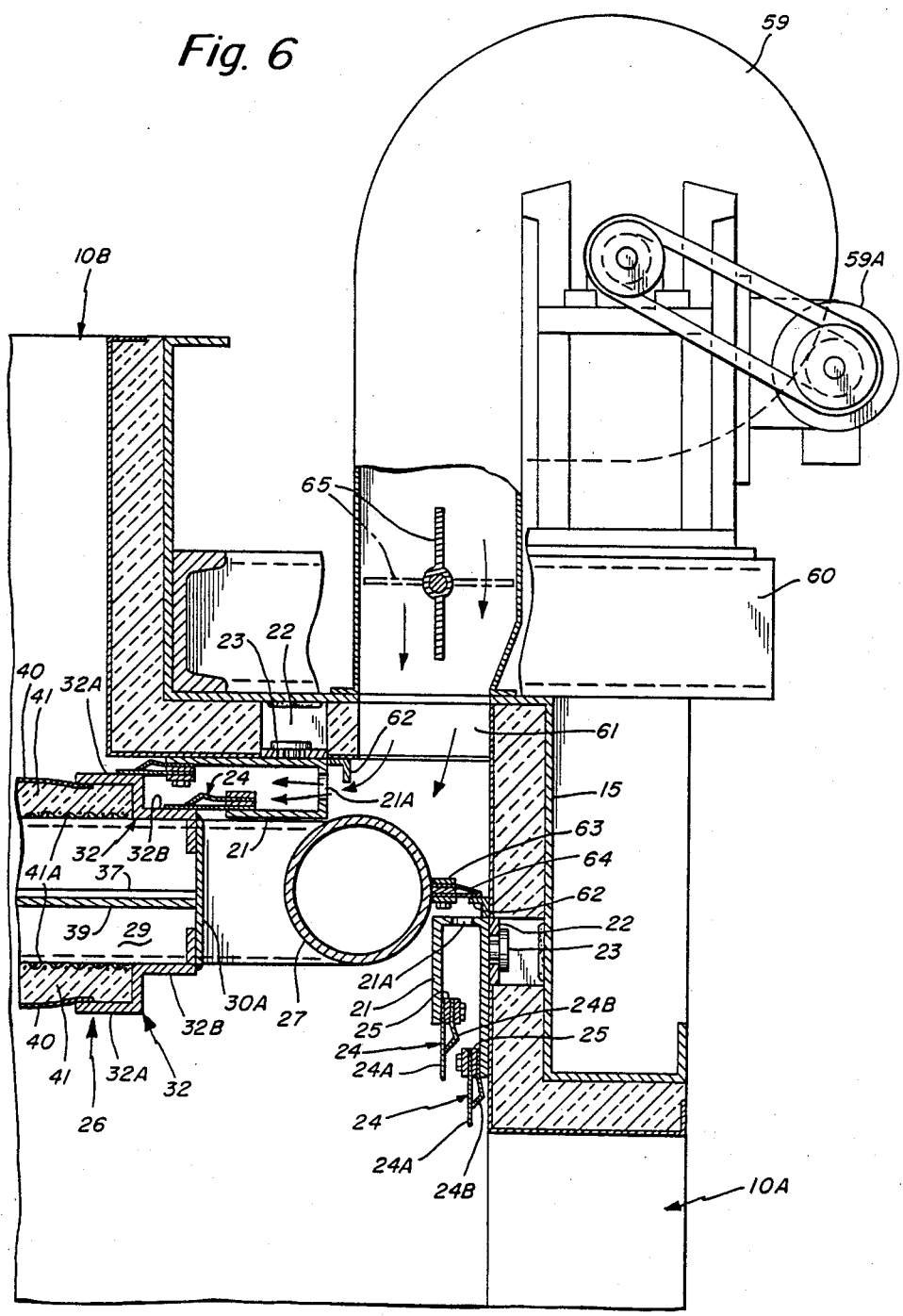
FIG. 6 is a section, on a further increased scale of a portion of the diverter taken approximately along line 6—6 of FIG. 3.

The diverter outlet port 10A in communication with the heat recovery steam generator and the diverter outlet port 10B in communication with the stack 13 are each surrounded by a square sealing frame 21 which is U-shaped in cross section with the channels of the four sides opening towards each other in the same plane. One channel wall of each frame is longer or wider than the other and is seated against the insulation surrounding the appropriate one of the outlet ports. Each frame 21 is held in place by clips 22 located in recesses in the insulation spaced about the port which it surrounds and welded to the walls 15 of the diverter. In practice (FIG. 6) headed connectors 23 extend through oversized holes in the clips and are anchored to the frames 21 thus enabling frame expansion to be accommodated. The heads of the connectors cover the holes in the clips at all times.

The frame walls seated against the insulation and the shorter or narrower walls both have stainless steel leaf spring type seals 24 secured to their outer ends. Each seal 24 (FIG. 6) seals 24 secured to their outer ends. Each seal 24 (FIG. 6) consists of first and second resilient stainless steel strips 24A and 24B, respectively, held apart by a spacing strip 25 through which the strips 24A and 24B are bolted to a frame 21. The first strips 24A are flat and the second strips 24B are so bent lengthwise as to engage and yieldably back the outer ends of the first strips 24A.

The blade of the diverter is generally indicated at 26 and is connected to a transverse pivot shaft 27 located within the diverter in a position between the ports 10A and 10B such that the blade may close either port as it is swung in one direction or the other. The ends of the pivot shaft 27 extend through the side walls of the diverter and are rotatably held by bearings 28 attached thereto.

The blade 26 has a plurality of spaced parallel tubular strengthening members 29 which extend the length of the blade and are rectangular in cross section with the number of such members depending on the dimensions of the blade. These strengthening members provide connections to which the blade actuating toggle joints are linked and also form with other structural members to which they are joined a reinforcing frame described below supporting the insulation and cladding which cover the blade and the disclosed embodiment there are but two members 29 as is typical of a blade approximately ten feet square. One end of each member 29 is welded to the pivot shaft 27 and adjacent said ends, sections of an end wall 30A are welded thereto to establish one side of the reinforcing frame square in shape whose other sides 30B are of U-shaped stock disposed with their channels opening outwardly. The other ends of the members 29 are secured to the frame side opposite the plate 30A.

The blade 26 has a pair of spaced apart, marginal frames generally indicated at 32 (FIGS. 4 and 5) which are shaped and dimensioned to provide first and second ledges 32A and 32B (FIG. 6) respectively, spaced one from the other in a manner such that each of them seats against the appropriate one of the seals 24 of a frame 21 when the blade 26 is positioned to close the port surrounded by that frame. One marginal frame 32 provides sealing ledges for engagement with the two seals 24 surrounding the port 10A and the other marginal frame 32 provides sealing ledges for engagement with the two seals surrounding the port 10B.

The blade marginal frames 32 are shown as connected to the three sides of the internal reinforcing frame by means of brackets 33 which are welded thereto. The brackets 33 of one marginal frame 32 are connected to one of the walls of the U-shaped sides of the reinforcing frame and the brackets 33 of the other frame 32 are similarly connected to the other walls of said sides. The space between the two frames thus connected to the members 30B are closed by plates 34. Along the sides of the internal reinforcing frame adjacent the pivot shaft 27, the frames 32 are supported by opposite sides of the tubular members 29 and are welded to opposite margins of the plate 30A. The opposite side of the frame has mounts 35 into both ends of which adjustable stops 36 are threaded for engagement with the appropriate one of the outlet port frames 21.

Figure 4:
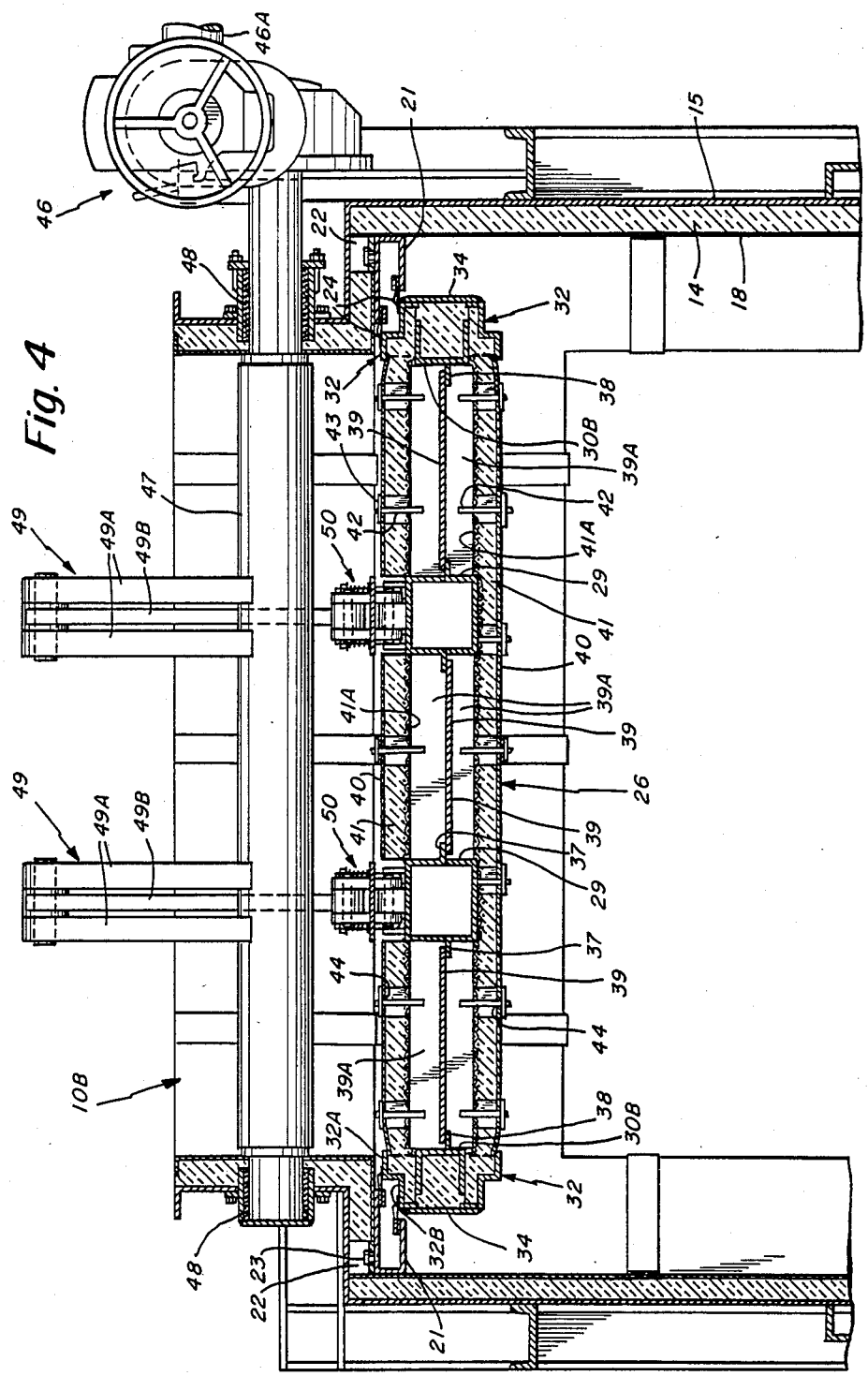
FIG. 4 is a section on a still larger scale taken approximately along line 4—4 of FIG. 2.

Referring to FIG. 4, the strengthening members 29 are shown as having centrally located, lengthwise flanges 37 extending along each side and the inner surface of the U-shaped sides 30B of the reinforcing frame have co-planar flanges 38. The flanges 37 and 38 have tie plates 39 connected thereto with the central one of the plates 39 shown as positioned on the side of the flange opposite to those against which the other two plates 39 are seated.

The blade 26 is completed by surface layers 40 of stainless steel of a thickness suitable for cladding and each layer 40 covers insulating boards 41 supported by an expanded wire mesh 41A.

Figure 3:
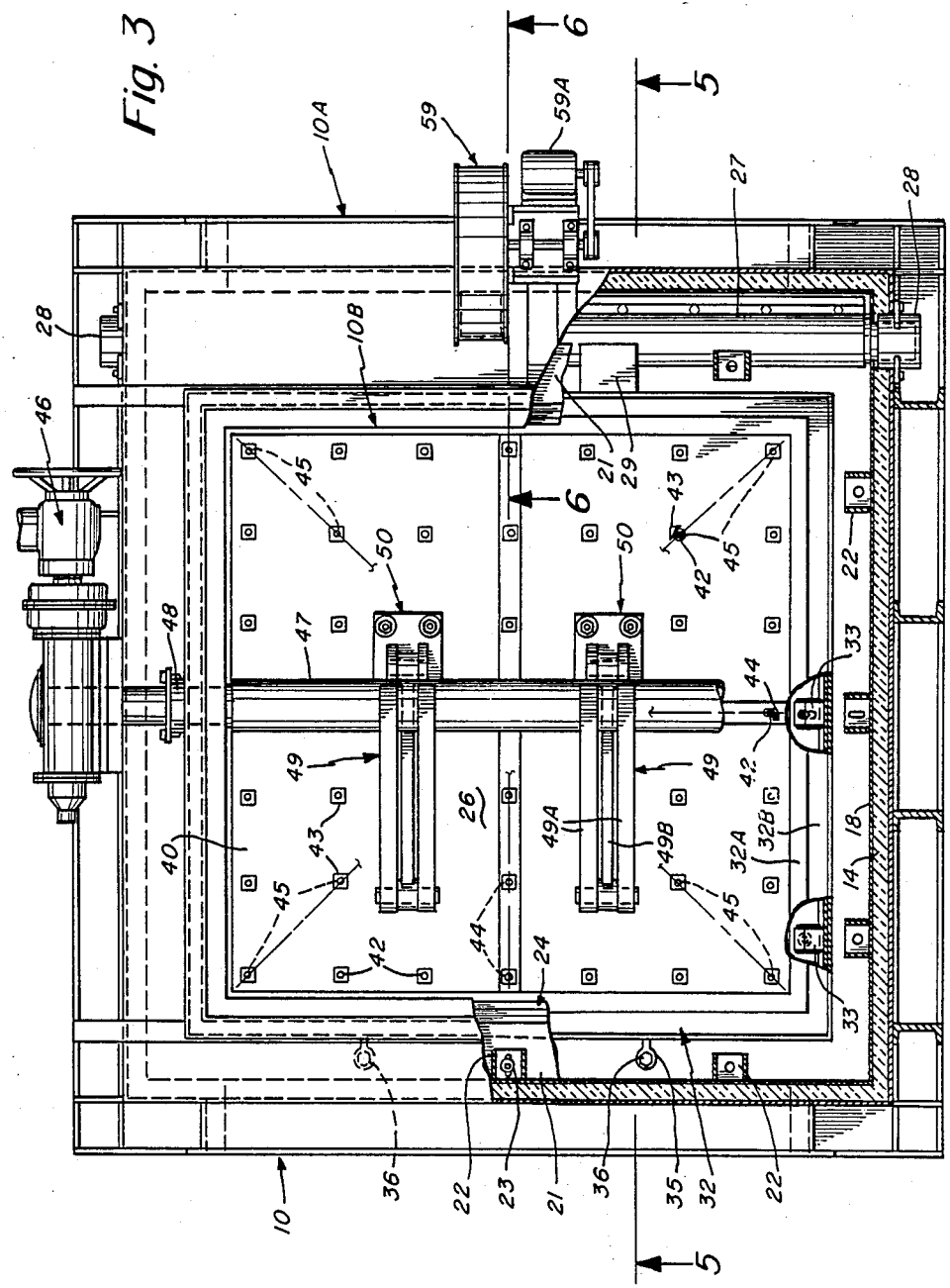
FIG. 3 is a plan view partially in section of the same.

Each cladding layer 40 is connected through the board 41 which it covers to the underlying blade structure, in this case the walls 39A on the plates 39 by means of pins 42 welded thereto. The pins 42 extend through holes in the cladding layer 40 and are provided with hole covering retainers 43. The hole arrangement (FIGS. 3 and 4) is such that there are two series of aligned slots 44 disposed at right angles relative to each other with each series extending between opposite sides of the layer and through the center of the cladding layer. In addition, there is a number of series of over-sized holes 45 which extend radially with respect to the center and are disposed at selected angles with respect to each other and to the two series of slots 44. With this hole arrangement, expansion of the cladding layers 40 is permitted but confined by the two series of slots 44. While the cladding layers may be unitary, they are usually, because of their size, formed in sections with the gaps between them covered in the same manner as the gaps between the liners 18 (FIGS. 9 and 10).

The blade 26 is swung 90° between its two operative positions by a motor driven rotary actuator generally indicated at 46 mounted on the outside of the diverter 10 along one side of the outlet port 10B with its shaft 47 extending across the center thereof parallel to the pivot shaft 27 and supported by bearings 48 mounted on the walls of the outlet port 10B. The actuator 46 is operable, for proper control of the gas flow as the blade is swung from one operative position to the other, to effect the changes in blade position in approximately one minute.

The links 49A of toggle joints, of which there is one in the disclosed embodiment for each member 29 of the blade reinforcing frame and which are generally indicated at 49, are connected to the shaft 47. The links 49A of each toggle joint are pivotally connected to the toggle joint link 49B which is pivotally connected to a unit, generally indicated at 50 and anchored to the appropriate one of the members 29. Where more than one member 29 is employed, the members and corresponding toggle joints are symmetrically spaced along the length of the blade to spread the force evenly and prevent blade distortion.

Figure 11:
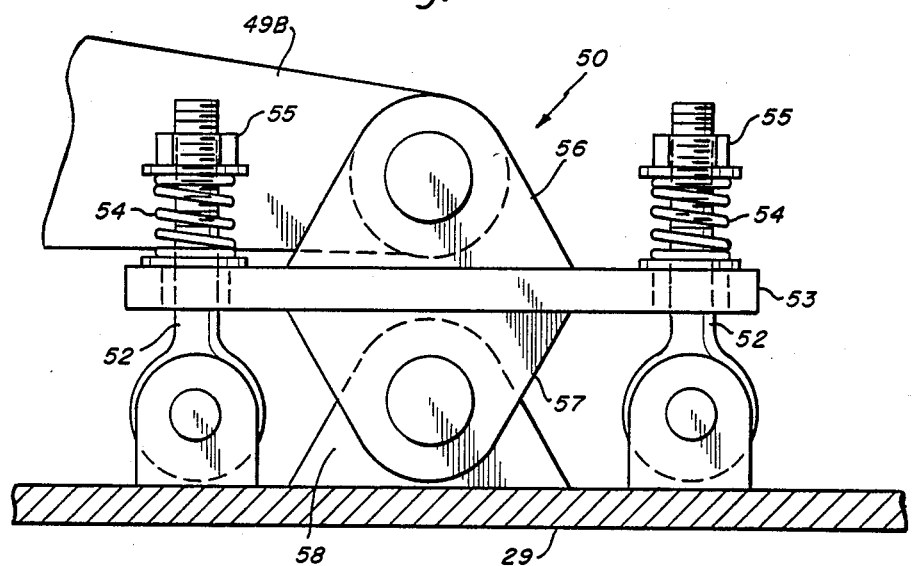
FIG. 11 is a side elevation of one of the units which connect the toggle joints of the blade actuating mechanism to the blade.
Figure 12:
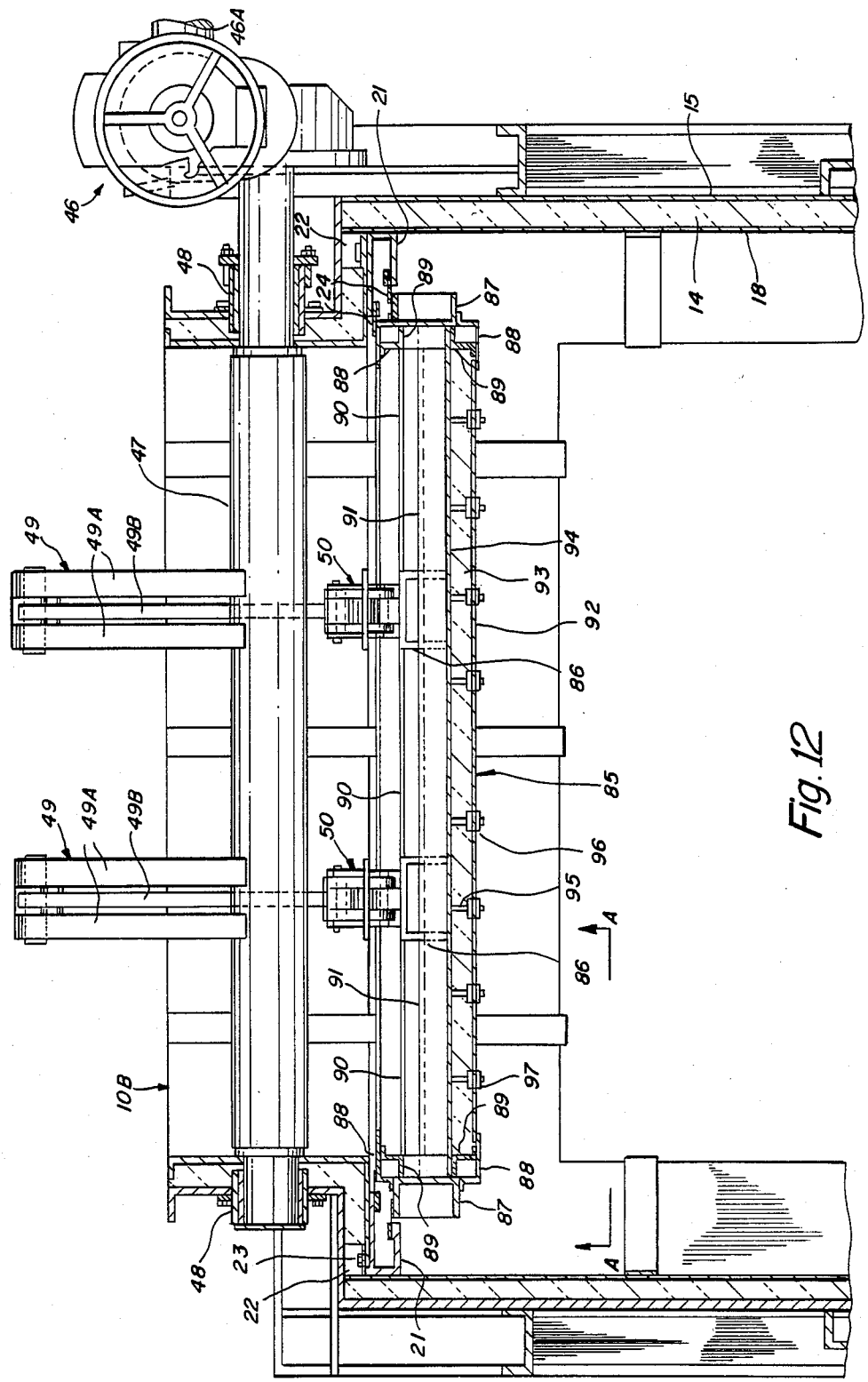
FIG. 12 is a view similar to FIG. 4 of an alternative embodiment of the invention wherein the blade is insulated only on one side.

Each unit 50 (FIG. 11) has a base plate 51 anchored to a member 29 with two spaced pairs of bolts 52 pivotally connected thereto with the bolts of each pair spaced apart and extending freely through a plate 53 and through coil springs 54 backed by the plate 53 and held tensioned by nuts 55 threaded on the bolts 52. The plate 53 has an upwardly disposed pair of ears 56 between the two pairs of bolts and receptive of the appropriate one of the toggle joint links 49B which is pivotally connected thereto. The plate 53 also has a downwardly disposed pair of ears 57 pivotally connected to an ear 58 mounted on the base plate 51. Each unit functions to accommodate thermal expansion forces by enabling the pivot axis between a toggle link 49B and the ears 56 to shift as required by such forces against the opposition of the springs 54. Since the toggle joints and units 50 are directly exposed to the hot gases when diverted through the stack 12, the pivots are of a ceramic type capable of withstanding without distortion the high temperatures to which they are exposed.

As the volume of the hot gases received by the diverter is large and is under considerable pressure, typically about 25 PSI gauge pressure, it is necessary to employ air under adequate pressure to ensure zero leakage through the seals.

Figure 5:
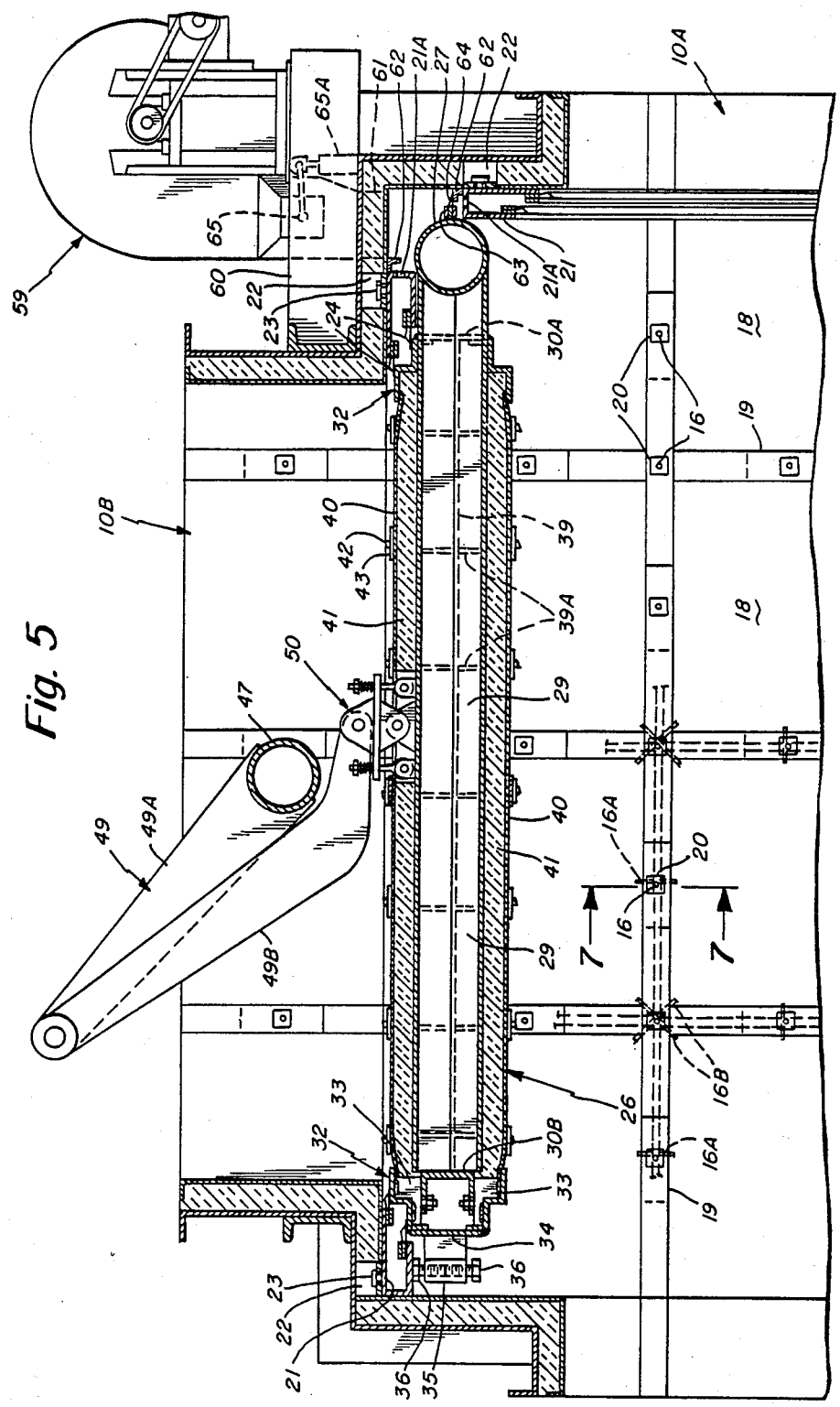
FIG. 5 is a section taken approximately along line 5—5 of FIG. 3.

As may be seen in FIG. 5, corners of the closed ends of the seal holding frames 21 are in lengthwise contact with the pivot shaft 27. A motor driven blower, generally indicated at 59, held by a mount 60 secured to the diverter 10 between the outlet ports 10A and 10B is operable to deliver the necessary volume of sealing air through a conduit 61 into the space in the diverter closed by the pivot shaft 27 and the above referred to closed ends of the sealing frames 21. The closed frame ends abutting the pivot shaft 27 have a series of ports 21A to receive such sealing air. Between the ported ends of each frame 21 and the conduit 61, there is a seat 62 extending across the interior of the diverter 10. The pivot shaft 27 has a lengthwise holder 63 for a seal 64 and is so located that when the blade 26 closes one of the outlet ports, the seal 64 engages one of the seats 62 to block the flow into the frame 21 surrounding the other outlet port with the air circulating through the frame 21 surrounding the closed port to prevent leakage through its seals.

DETAILED DESCRIPTION OF SECOND PREFERRED EMBODIMENT

The blade of a second, presently greatly preferred, embodiment is generally indicated at 85. In this embodiment the tubular strengthening member 29 has been replaced with a gusset 86 adapted to be linked to the toggles 49 for driving the blade from one position to the other. In addition, in this embodiment, the blade is insulated on only one side by insulation 93, in this on the side which faces into the chamber of the diverter when the blade closes the outlet 10B to the stack 13.

In this embodiment, a stainless steel membrane 94 defines the area of ports 10B and 10A and presents a solid steel surface on which the exhaust gases may impact when the port 10A is closed. It has been found that such an arrangement may provide in some cases a more durable surface than the cladding 40 of the previous embodiment.

The blade structure of this embodiment comprises a central primary rib 90, with secondary reinforcing ribs 91, one on each side and spaced from the rib 90. These ribs are welded to one side of the steel membrane 94 for strengthening purposes. On the other side is held a layer of insulation 93 by means of pins 95 extending through the cladding 92 and welded to membrane 94. The holes 97 for the pins 95 are oversized, optionally slotted, and are covered by retainers 96. The gusset 86 is welded to the other side of membrane 94, thus together with the ribs 90 and 91 forming a completely rigid blade structure not subject to warping when subjected to the heat of the hot exhaust gases.

Figure 14:
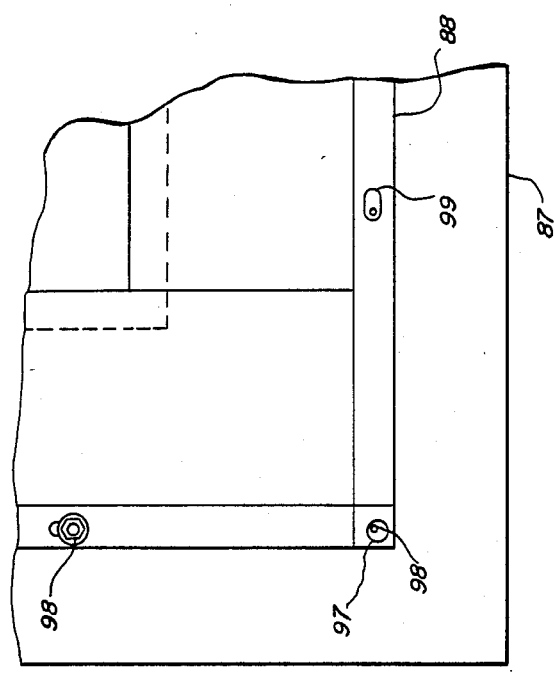
FIG. 14 is a fragmentary view on an enlarged scale illustrating the connection permitting thermal expansion of the blade relative to its peripheral elements.
Figure 13:
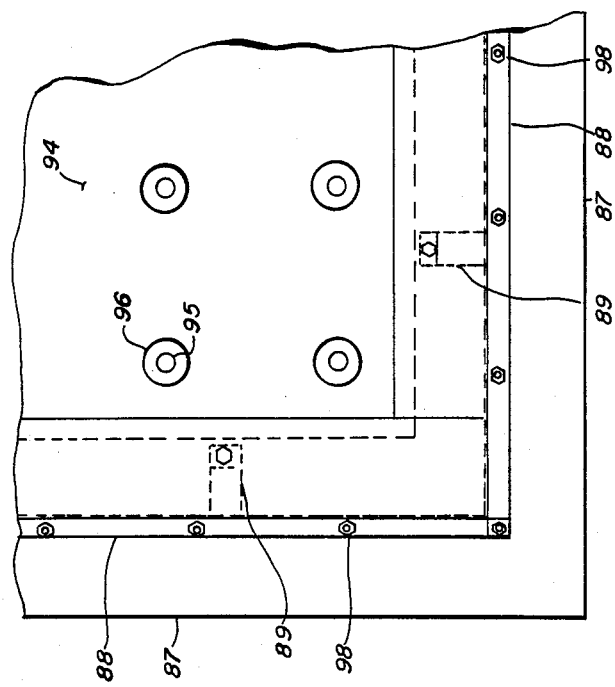
FIG. 13 is a bottom view taken on line A—A of FIG. 13 showing the connecting means permitting thermal expansion of the cladding and associated parts.
Figure 15:
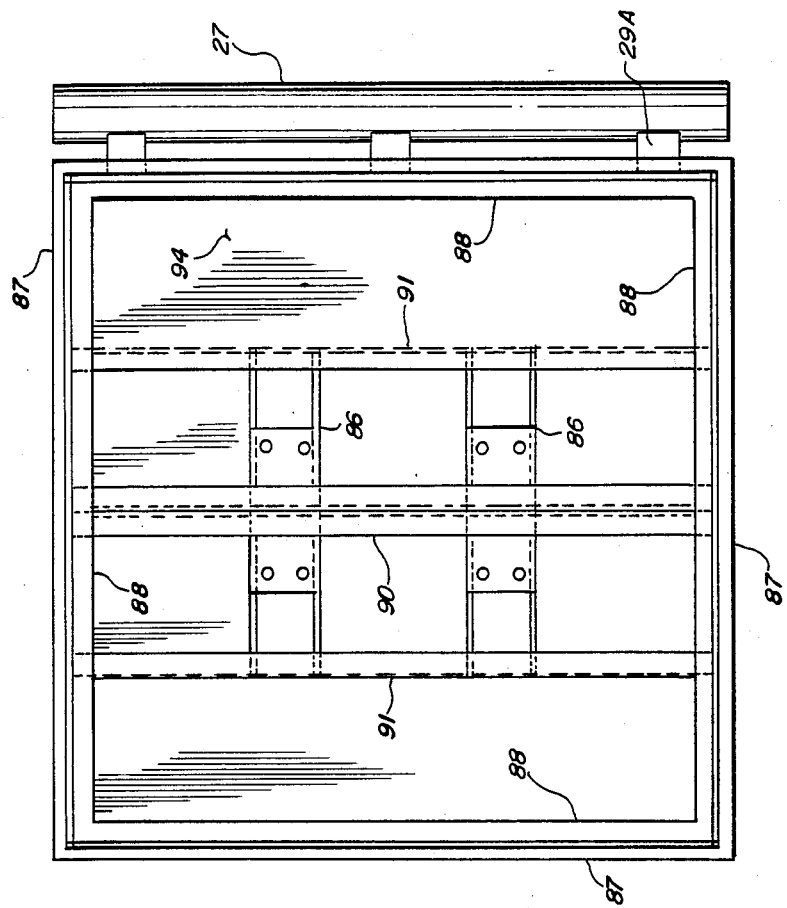
FIG. 15 is a top plan view of the blade itself in accordance with the alternative embodiment.

The side edges of the blade 85 are completed by seal ledges 87 and 88 which engage seals 24 (FIG. 6) when the blade is in either closed position. Seal ledge 87 is formed by a surface of a perimeter channel frame identified by the same numeral and which defines the perimeter of the blade. Seal ledge 88 is formed by a surface of a marginal frame identified by the same numeral which overlies the cladding 92 and is supported by braces 89. Marginal frame 88 is connected to channel frame 87 by a series of anchor pins 95 which extend through oversized holes 97 and/or slots 99 (FIGS. 13 and 14) and are held by threaded fastener assemblies 98.

OPERATION

From the foregoing description of two preferred embodiments of the invention, it will be seen that the diverter blade can be swung from one position wherein it closes port 10B to another where it closes port 10A. In normal operation, port 10B is closed permitting the exhaust to pass to a heat recovery steam generator. When it becomes necessary for maintenance purposes to shut down the generator, the blade is swung to a position blocking port 10A thereby diverting the exhaust to the stack 13. While the blade is in either of its closed positions, sealing air under pressure supplements seals 24 to prevent escape of gases as previously explained. During swinging of the blade air from blower 59 is cut off by shutting down blower motor 59A while damper 65 is closed to prevent escape of exhaust gas. Obviously, motor 46 and motor 59A must be turned on and off and reversed, as needed.

It will, therefore, be understood that electrical and/or electronic devices are needed to energize and reverse the blade shifting motor 46, operate and shut off the blower motor 59 and control the damper valve 65 all in proper timed relation to each other. Standard electrical controls, including sensors, limit switches and the like, may be used for this purpose and their selection and use are well within the skill of the art. Accordingly, details thereof are not herein set forth.

While there has herein been disclosed and described presently preferred embodiments of the invention, it will nevertheless be understood that this specification is intended to be by way of illustration and not by way of limitation and that the scope of the invention is to be measured only by the proper interpretation to be afforded the appended claims.

We claim:

1. In a gas flow diverter for diverting hot gases from an inlet port to either of first and second mutually spaced outlet ports of a chamber by a blade pivotally mounted to swing between two positions within the chamber in each of which one outlet port is closed by the blade and the other is opened, said blade being connected to a pivot shaft rotatably mounted within said chamber and being linked by toggle joints to an actuator shaft spaced from and parallel to said pivot shaft, the improvement comprising a marginal frame about said blade, both sides of which comprise first ledges, and a central projection, both sides of which comprise second ledges, a U-shaped sealing frame surrounding each outlet port, and comprising first and second side walls, with said first side wall longer than said second side wall, each of said sealing frames secured to the chamber wall and having an open end that opens into the chamber; and leaf spring sealing members mounted on said side walls;

the sealing members of said first and second side walls being constructed and arranged to enter into sealing engagement with said first and second ledges, respectively, on the appropriate side of said blade marginal frame when said blade is in one of said two positions and said actuator shaft being operable to adjust the position of said blade between said first and second positions.

2. The diverter of claim 1 further comprising means for delivering sealing air into a closed space formed within either of said sealing frames when such sealing frame is engaged by said blade.

3. The diverter of claim 2 further comprising means to isolate the interior of the chamber from the means for delivering sealing air during movement of said blade between its two positions.

4. The diverter of claim 1 including a layer of insulation secured to and lining each interior surface of said chamber and wherein said blade further comprises at least one strengthening member to which its marginal frame is connected, a layer of insulation covering at least that side of said blade remote from the connections to said actuator shaft, cladding overlying said layer of insulation, and means for retaining said layer of insulation in place, said retaining means being constructed and arranged to permit thermal expansion of the cladding.

5. The diverter of claim 4 including a layer of insulation on the other side of said blade positioned on each side of each strengthening member.

6. The diverter of claim 4 or claim 5 wherein said retaining means comprises a series of pins anchoring the insulation to the underlying blade structure and extending through the cladding and insulation through oversized openings to permit such thermal expansion.

7. The diverter of claim 4 including pivotal connecting means connecting each of said toggle joints to a respective strengthening member.

8. The diverter of claim 7 wherein said strengthening members are at least two in number and are spaced from each other and from the blade ends.

9. The diverter of claim 8 wherein each of said pivotal connecting means comprises a base plate connected to a corresponding strengthening member, a second plate pivotally connected to the said base plate, a toggle joint link pivotally connected to said second plate, and resilient means connected between said plates, thereby to enable said second plate to move relative to said base plate in response to thermal expansion forces exerted thereon by the toggle joint connected thereto.

10. The diverter of claim 7 wherein said strengthening members are at least two in number and extend the length of the blade.

11. The diverter of claim 4 wherein said blade further comprises a stainless steel membrane defining the area of the chamber outlet ports and at least one strengthening member for said membrane, said layer of insulation covering only that side of said blade remote from the connections to said actuator shaft.

12. The diverter of claim 11 wherein said marginal frame is formed of two parts comprising a secondary channel frame member both sides of which comprise the first sealing ledges and a central member connected to said secondary frame having surfaces defining said second ledges, said members being connected to each other by retaining means permitting thermal expansion of the blade relative to said members.

* * * * *

UNITED STATES PATENT AND TRADEMARK OFFICE
CERTIFICATE OF CORRECTION

PATENT NO. :   4,919,169

DATED      :   April 24, 1990

INVENTOR(S) :  Lothar Bachmann and William F. Koch

It is certified that error appears in the above-identified patent and that said Letters Patent is hereby corrected as shown below:

Col. 1 line 50, "b" should be -- by --;

Col. 2 line 8, after "movement" insert -- of --;

Col. 4 line 40, after "blade and" insert -- strengthening the blade against undesired distortion in use. In --;

Col. 6 line 51, after "this" insert --case --.

Signed and Sealed this

Twenty-third Day of July, 1991

Attest:

HARRY F. MANBECK, JR.

Attesting Officer         Commissioner of Patents and Trademarks